H. FOERSTERLING.
PROCESS OF REDUCING METALLIC COMPOUNDS.
APPLICATION FILED DEC. 30, 1912. RENEWED MAR. 28, 1918.
1,283,716.
Patented Nov. 5, 1918.
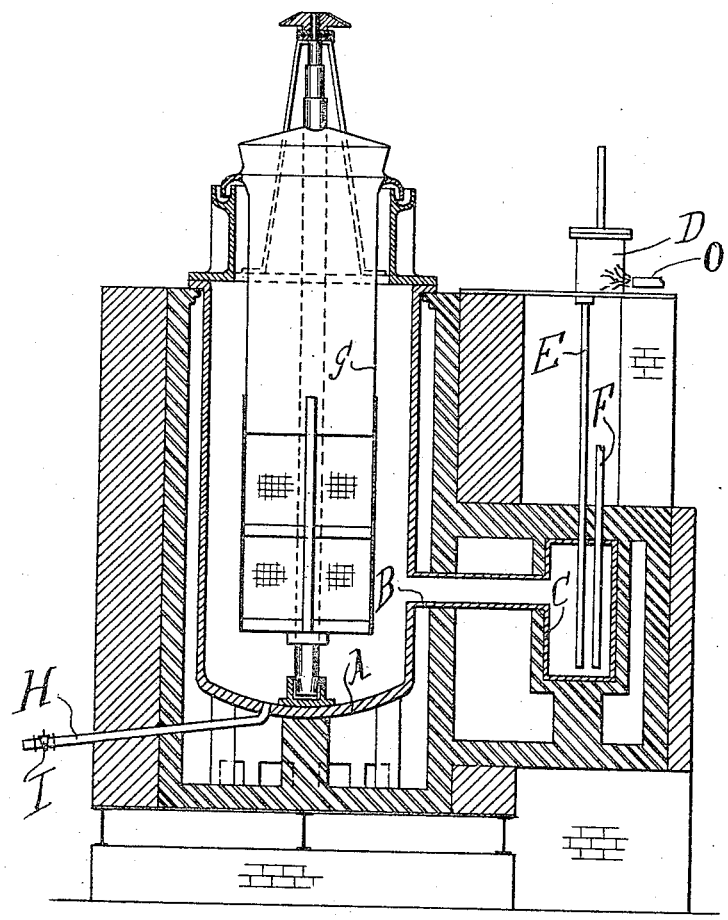
WITNESSES:
INVENTOR.

UNITED STATES PATENT OFFICE.

HANS FOERSTERLING, OF PERTH AMBOY, NEW JERSEY.

PROCESS OF REDUCING METALLIC COMPOUNDS.

1,283,716.      Specification of Letters Patent.      Patented Nov. 5, 1918.

Application filed December 30, 1912, Serial No. 739,352. Renewed March 28, 1918. Serial No. 225,369.

*To all whom it may concern:*

Be it known that I, HANS FOERSTERLING, a subject of the Emperor of Germany, and a resident of Perth Amboy, county of Middlesex, and State of New Jersey, have invented certain new and useful Improvements in Processes of Reducing Metallic Compounds, of which the following is a specification.

This invention has reference to improvements in processes of reducing metallic compounds by chemical means wherein the compound to be reduced is reacted upon by a volatile metal preferably in a vaporous state and a gas capable of entering into combination with one or more of the constituents of the reaction, thus producing valuable by-products simultaneously with the reduction.

In order to illustrate the practice of my new process, I shall describe the same in connection with a process of reducing a metallic compound by reacting on the same with a nitrogenous gas and the vapor of a volatile metal capable of forming a nitrogenous compound.

As a specific example of a means of practising my new process, I shall describe the reduction of a metallic oxid to a metal by means of sodium vapors separated from a compound or an alloy containing sodium as the volatile metal, or from sodium metal *per se* in the presence of carbonaceous and nitrogenous matter, which reaction is represented by the following equations, viz:

1. 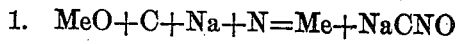 MeO+C+Na+N=Me+NaCNO and

2. 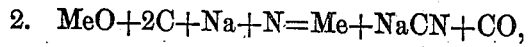 MeO+2C+Na+N=Me+NaCN+CO,

Me representing the metal of a metallic oxid.

In order to readily carry out the reaction described, the metallic oxid or other compound to be reduced may be mixed with the carbonaceous material such as coke and formed into briquets by admixture with a suitable binder, such as pitch.

The briquets may then be charged into a suitable furnace which is heated to a temperature sufficiently high to start the reduction process, when the vapors of the metallic sodium and a gas containing nitrogen may be admitted into the furnace and caused to pass over the briquets. It is obvious that the proportion of carbonaceous matter contained in the mixture is an important factor as to whether the reaction takes place according to equation 1 or 2 or as to whether compounds according to both reactions are formed simultaneously, but in either case the process is continuously progressive, and I could not observe that a retransformation of the generated metal into its oxid takes place, this observation being also confirmed by the yields obtained.

The reaction according to both the above equations is more or less exothermic, depending on the affinity of the sodium for oxygen and the proportion of oxygen contained in the metallic oxid. If, for instance, the metallic oxid is readily broken up by sodium, setting free oxygen and producing a large number of heat units, the formation of the nitrogenous compounds, obtained as a by-product, continues without further expenditure of fuel when once started.

If the metal of the metallic oxid combines with nitrogen, the metallic oxid is not reduced to the state of metal as such, but to its combination product with nitrogen.

In the following, in connection with the accompanying drawing, I shall describe a form of apparatus which I prefer in carrying out the reaction pointed out above:

The drawing is a vertical sectional view of one form of apparatus suitable for the carrying out of my process.

In the drawing A indicates an iron pot, connected by means of a pipe B with a smaller iron pot C. Each of the pots is placed in a furnace provided with suitable means for heating the same. A feed-pot D is located above pot C to permit the charging of sodium into pot C by means of pipe E. Pot D may be heated by any suitable means, as for instance gas burner O, in order to melt the sodium. F indicates a second pipe leading into pot C through which nitrogen or gases containing nitrogen from any suitable source (not shown) can be passed. A basket G, the lower part of which is perforated, is mounted so as to be capable of revolving within pot A and is adapted to receive the briquets described. Pot A has an outlet pipe H at the bottom provided with a cock I, through which the material formed in pot A can be continuously discharged in a liquid state.

In order to start the process the small pot C is heated and when the temperature reaches about the point at which sodium vaporizes, the latter metal is admitted from pot D into pot C and nitrogen is passed into pot C through pipe F.

While pot C is being prepared as described, the basket G is charged with the briquets and pot A is covered and heated to the temperature required to begin the reaction. The mixture of sodium and nitrogen vapors, prepared in pot C, then passes into pot A and reacts with the heated briquets, the complete reaction resulting in the forming of a metal and sodium-nitrogen compounds; the products of the reaction may be drained off through pipe H at the bottom of pot A, and subsequently separated by any suitable means.

After the process has once been started, I have found that very little fuel is required to keep pot A at the temperature required for reaction, the promotion of the reduction process by the heat of reaction being so great that it is almost self-sustaining, the small amount of additional heat required from outside serving only to balance the loss of heat due to radiation and other sources of heat loss.

If the metal of the metallic oxid combines with nitrogen forming a compound infusible at the temperature of the process, the infusible material should be removed from the basket in any suitable way.

It is obvious that the process described above may be carried out in any suitable apparatus which may differ greatly from that described above as many mechanical contrivances may be found which will readily allow the various operations described, to be performed; as the apparatus described is therefore unessential to my method, I shall not claim any special form of apparatus for the operation of my invention. Many changes may also be made in the mode of operating the process, as far as its purely chemical side is concerned, which changes in their character will in no way deviate from the spirit of my invention and I therefore shall not restrict myself to the mode of carrying out the process as described further than the scope of the appended claims demand.

One modification on the chemical side of the process consists in charging sodium or other suitable metal directly into the pot A and permitting it to react on the briquets in the presence of nitrogen or other suitable gas instead of admitting the sodium or other metal in the form of vapor. The sodium or other metal in such case may react either in the metallic state or the vaporous state or partially in each according to the temperature and the nature of the reaction. It is furthermore understood that my invention is not to be restricted to metal oxids as a suitable raw material for my invention, inasmuch as I may submit other oxygen bearing compounds than metallic oxids to the effects of my process by treating the same with a gas and a volatile metal as described. I particularly wish to be understood that I use the term "metallic compound" in its broadest interpretation, so as to distinctly include materials like ore, or a plurality of such ores, in either their natural or prepared state; I may also substitute the volatile metal *per se* by using compounds or alloys containing such volatile metal.

Finally I wish to declare that I do not restrict myself to the use of sodium as a volatile metal, for the decomposition or reduction of the chemical compounds, but any other metal, which like sodium may be volatilized, is claimed as coming within the scope of my invention and whenever I use the expression "volatile metal" a plurality of such volatile metals is comprised in this term.

What I claim and desire to secure by Letters Patent is:

1. A process of reducing metallic compounds with simultaneous production of a nitrogenous compound consisting in reducing the oxid of a metal by reacting on the same with a metal in vaporous form in the presence of nitrogenous matter.

2. A process of reducing metallic compounds with simultaneous production of a cyanid consisting in reducing the oxid of a metal by reacting on the same with a metal in vaporous form in the presence of carbonaceous and nitrogenous matter.

3. A process of reducing metallic compounds with simultaneous production of sodium cyanid consisting in reducing the oxid of a metal by reacting the same with sodium vapors in the presence of carbonaceous and nitrogenous matter.

4. A process of reducing metallic compounds with simultaneous production of a cyanid consisting in reducing the oxid of a metal by reacting on the same with a metal in vaporous form in the presence of carbonaceous and nitrogenous matter at a temperature suitable for the formation of the cyanid of the vaporized metal and promoting the reduction process by the heat liberated in the formation of the cyanid.

5. A process of reducing metallic compounds with simultaneous production of a cyanid consisting in reducing the oxid of a metal by reacting on the same with a metal in vaporous form in the presence of carbonaceous and nitrogenous matter at a temperature suitable for the formation of the cyanid of the vaporized metal and rendering the reduction process substantially self-sustaining by the heat liberated in the formation of the cyanid.

6. A process of reducing metallic compounds with simultaneous production of sodium cyanid consisting in reducing the oxid of a metal by reacting on the same with sodium vapors in the presence of carbonaceous and nitrogenous matter at a temperature suitable for the formation of the cyanid and rendering the reduction process substantially self-sustaining by the heat liberated by the formation of the cyanid.

7. A process of reducing metallic compounds with simultaneous production of sodium cyanid consisting in reducing the oxid of a metal by reacting on the same with sodium in the presence of carbonaceous and nitrogenous matter at a temperature suitable for the formation of the cyanid and rendering the reduction process substantially self-sustaining by the heat liberated by the formation of the cyanid.

8. A process of reducing metallic compounds with simultaneous production of a nitrogenous compound consisting in reducing oxygen bearing metal compounds by reacting on the same with a metal in vaporous form in the presence of nitrogenous matter.

In testimony whereof I have signed this specification in the presence of two subscribing witnesses.

HANS FOERSTERLING.

Witnesses:
  H. PHILIPP,
  OTTO K. ZWINGENBERGER.